United States Patent
Schiller et al.

(10) Patent No.: US 12,332,887 B2
(45) Date of Patent: Jun. 17, 2025

(54) QUERY AND DATA ADAPTIVE SYNOPSIS TABLE

(71) Applicant: International Business Machines Corporation, Armonk, NY (US)

(72) Inventors: Oliver Schiller, Dettingen (DE); Tobias Kevin Fränzel, Tuebingen (DE); James Liam Finnie, Renningen (DE); Thomas Friedhelm Böhme, Böblingen (DE); Toni Bollinger, Weil der Stadt (DE); Wieland Philipp Hoffmann, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/468,769

(22) Filed: Sep. 18, 2023

(65) Prior Publication Data
US 2025/0094420 A1    Mar. 20, 2025

(51) Int. Cl.
| G06F 16/00 | (2019.01) |
| G06F 7/00 | (2006.01) |
| G06F 16/22 | (2019.01) |
| G06F 16/2453 | (2019.01) |

(52) U.S. Cl.
CPC .... G06F 16/24539 (2019.01); G06F 16/2282 (2019.01)

(58) Field of Classification Search
CPC ................ G06F 16/24539; G06F 16/2282
USPC .......................................................... 707/721
See application file for complete search history.

(56) References Cited

U.S. PATENT DOCUMENTS

| 2008/0133454 A1 | 6/2008 | Markl et al. |
| 2009/0265325 A1 | 10/2009 | Camoglu et al. |
| 2017/0024452 A1 | 1/2017 | Budalakoti et al. |
| 2017/0293649 A1 | 10/2017 | Finlay et al. |
| 2017/0308572 A1 | 10/2017 | Finlay et al. |
| 2018/0107701 A1 | 4/2018 | Boehme et al. |
| 2018/0113900 A1 | 4/2018 | Beier et al. |
| 2019/0236192 A1* | 8/2019 | Zou ................... G06F 16/24554 |
| 2022/0004427 A1* | 1/2022 | Savant ................ G06F 9/44505 |

OTHER PUBLICATIONS

Acosta et al., "Exploiting the properties of query workload and file name distributions to improve p2p synopsis-based searches." IEEE Infocom 2008—The 27th Conference on Computer Communications. IEEE, 2008, 5 pages.

(Continued)

*Primary Examiner* — Raquel Perez-Arroyo
(74) *Attorney, Agent, or Firm* — CANTOR COLBURN LLP; Teddi Maranzano (57) ABSTRACT

Aspects of the invention include techniques for providing a query and data adaptive synopsis table. A non-limiting example method includes building a first synopsis table containing metadata for a database table. Information from queries executed against the database table is collected. The collected information is analyzed, responsive to a number of queries executed against the database table exceeding a query collection threshold, to identify one or more queries for which the first synopsis table was suboptimal. The method includes building, for each of the one or more queries for which the first synopsis table was suboptimal, a second synopsis table.

14 Claims, 5 Drawing Sheets

(56) References Cited

OTHER PUBLICATIONS

Deshpande et al., "On using correlation-based synopses during query optimization," Computer Science Division, University of California, 2002, 28 pages.
Duan et al., "Processing forecasting queries." Proceedings of the 33rd international conference on Very large data bases. 2007, pp. 711-722.
IBM, "Zone Maps" https://www.ibm.com/docs/en/daafz/5.1?topic=concepts-zone-maps (retrieved Jul. 10, 2023), 1 page.
IBM, "Synopsis tables." https://www.ibm.com/docs/en/db2/11.5?topic=organization-synopsis-tables (retrieved Jul. 10, 2023), 2 page.

* cited by examiner

QUERY AND DATA ADAPTIVE SYNOPSIS TABLE

BACKGROUND

The present invention generally relates to database queries and synopsis tables, and more specifically, to computer systems, computer-implemented methods, and computer program products for a query and data adaptive synopsis table.

Synopsis tables, also known as zone maps, are database optimization features used to enhance query performance by precomputing and storing summary statistics about the data in a database table. These statistics allow a database management system (DBMS) to make informed decisions when determining how to execute a query most efficiently. For example, a synopsis table can provide metadata that helps the DBMS skip irrelevant data during query evaluation. This approach is particularly useful when dealing with large data sets, as it reduces the amount of data that needs to be scanned or retrieved during query execution.

Synopsis table metadata can include aggregated information about values found in a predetermined subset of the underlying database table, such as the minimum and maximum values for each column within a predefined range of rows. Other metadata can include data range boundaries, data distributions, such as the number of distinct values in a column, the frequency of those values, and histograms representing the distribution of values across the respective data ranges, data cardinalities, such as the number of rows within specific value ranges or satisfying certain predicates, the presence and/or location of null values, and the various data types found in the columns.

SUMMARY

Embodiments of the present invention are directed to techniques for providing a query and data adaptive synopsis table. A non-limiting example method includes building a first synopsis table containing metadata for a database table. Information from queries executed against the database table is collected. The collected information is analyzed, responsive to a number of queries executed against the database table exceeding a query collection threshold, to identify one or more queries for which the first synopsis table was suboptimal. The method includes building, for each of the one or more queries for which the first synopsis table was suboptimal, a second synopsis table.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

Queries can be executed against a database using a database management system (DBMS). When a query is received by the DBMS, a query optimizer (often itself a component/module of the DBMS) analyzes the query and determines the most efficient execution plan. Selecting an optimal query plan is challenging due to several factors. The cost model is often complex, relying on various parameters about the data that flows through the operators as well as the resources available for processing the data. The data parameters themselves are usually not known at compile time and are often estimated. In particular, the costs estimated by a cost model may have poor correlations with the execution time of actual queries due, in part, to inaccurate input parameters, incomplete information, and the effects of simplifying assumptions made for making the estimations.

During query execution, a DBMS query optimizer can use the metadata in a synopsis table to make informed decisions about which data segments to access and which to skip (i.e., an efficient execution plan). For example, when a query involves predicates such as equalities, range comparisons, membership checks, etc., the query optimizer can consult the synopsis table to determine whether a specific data segment contains information relevant to the predicate. If the values in the segment fall outside the specified predicate, the system can skip that segment entirely, leading to substantial performance gains.

In some implementations, a synopsis table is built for every n rows in each column of a database table. In these configurations, when a query is executed, the DBMS can examine the synopsis tables to quickly identify which synopsis tables and/or data ranges need to be accessed, significantly reducing the amount of data that needs to be fetched from the main table. This type of architecture aids in avoiding unnecessary data retrieval and reduces filtering, resulting in further improvements in query performance.

Unfortunately, current synopsis table implementations are somewhat limited. In particular, synopsis tables, once built, are mostly static constructions that update, if at all, in response to changes in the underlying data invalidating the synopsis metadata. In other words, a synopsis table will update to ensure that the metadata itself is accurate. For example, a synopsis table might update when a "maximum value" is no longer accurate (e.g., a new value has been added to a row/column that is higher than the current maximum value in the synopsis table metadata).

This disclosure introduces new methods, computing systems, and computer program products for providing a query and data adaptive synopsis table. Rather than simply implementing a synopsis table that updates to ensure accurate metadata, described herein is a dynamic synopsis table architecture that adapts based on query and data patterns. In some embodiments, a base synopsis table (also referred to as an original synopsis table) is built for a column in a database table. After the base synopsis table is constructed, information about queries executed against the database table and/or the base synopsis table is continuously and/or periodically collected. After a predetermined number of queries have been collected, the collected query data is analyzed to find one or more queries for which the original synopsis can be improved. The base synopsis table is then optimized (i.e., a new synopsis table is built) for these queries.

Optimizations can include, for example, determining that additional synopsis information (or less synopsis information) would be beneficial for query performance. For example, consider a scenario where a synopsis range is found to be too large (e.g., empirically via query review). In this case, outliers can be identified and separate synopsis entries can be generated for them. Those outliers can then be removed from the original synopsis. In another example, consider a scenario where a majority of queries search for the same set of literals. In this case, a synopsis can be built specifically for this set of commonly targeted literals. In yet another example, consider a scenario where predicates are always found in the same region of the database table (e.g., last month data). In this case, a partial synopsis table can be built for this region, and, conversely, unused rows can be removed.

A synopsis table architecture that dynamically updates in response to query and data patterns in accordance with one or more embodiments described herein offers various technical advantages over prior approaches to synopsis table implementation. For example, if the set of rows over which a synopsis is built contains an outlier, the minimum and maximum values might not accurately represent the majority of the values in the data set. While a static synopsis table will continue providing unhelpful min/max values, this could be solved dynamically by capturing outliers separately (that is, outliers can be identified and separate synopsis entries can be generated for them). Another technical advantage is demonstrated in scenarios where the majority of queries involve the same subset of data (e.g., a same set of literals as described previously). A static synopsis table will continue maintaining all of the synopsis metadata regardless of observed query statistics. This can be optimized by dynamically building a compact synopsis specifically for this set of literals. A compact (smaller) synopsis that removes excessive synopsis information deemed unhelpful (e.g., the less commonly queried literals) directly increases query performance and reduces synopsis entry memory and storage costs, as there are less synopsis entries to inspect for each query). Other advantages are possible. For example, synopsis information can be merged for infrequently queried data (i.e., "cold data") and/or when multiple adjacent synopsis entries have similar filtering characteristics.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
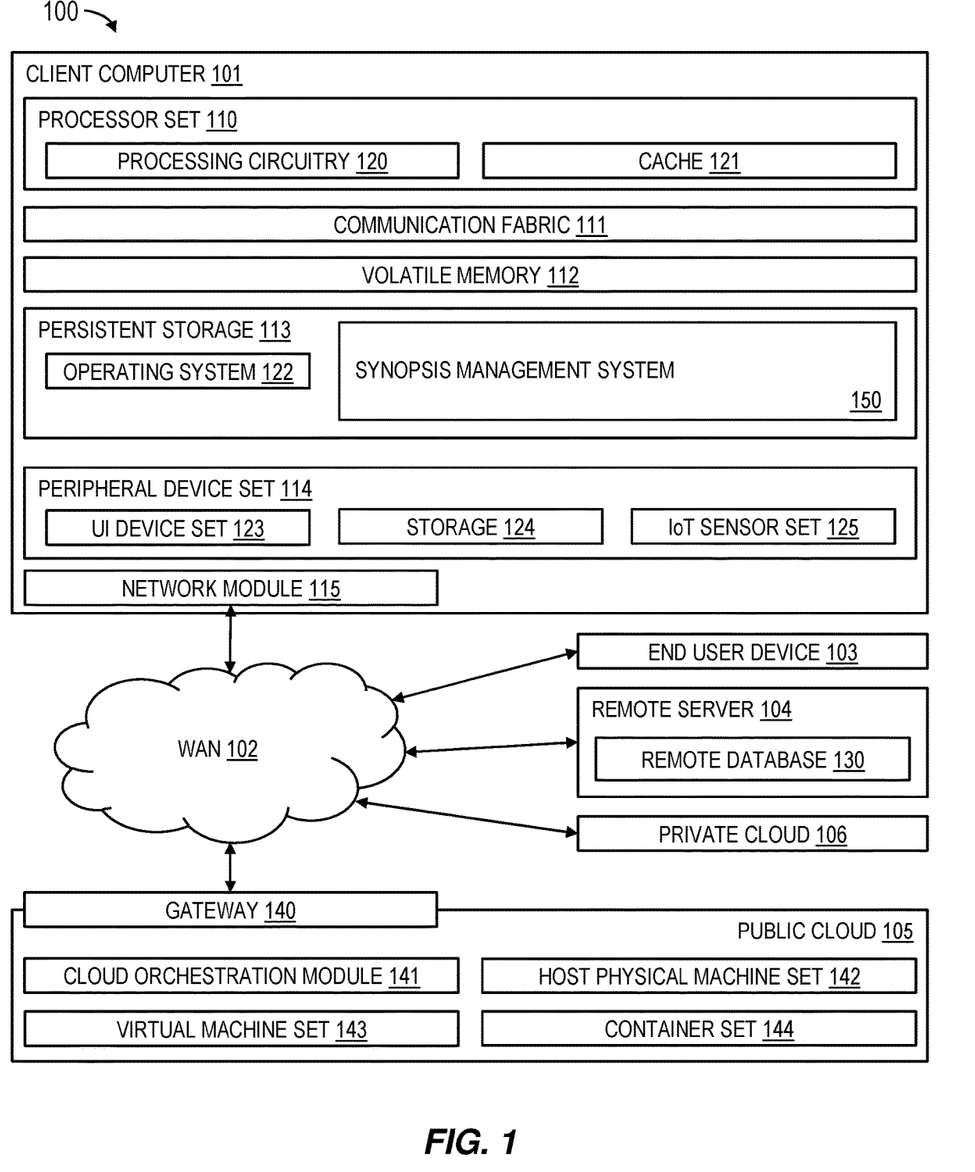
FIG. 1 depicts a block diagram of an example computing environment for use in conjunction with one or more embodiments.

Referring now to FIG. 1, computing environment 100 contains an example of an environment for the execution of at least some of the computer code involved in performing the inventive methods, such as synopsis management system 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
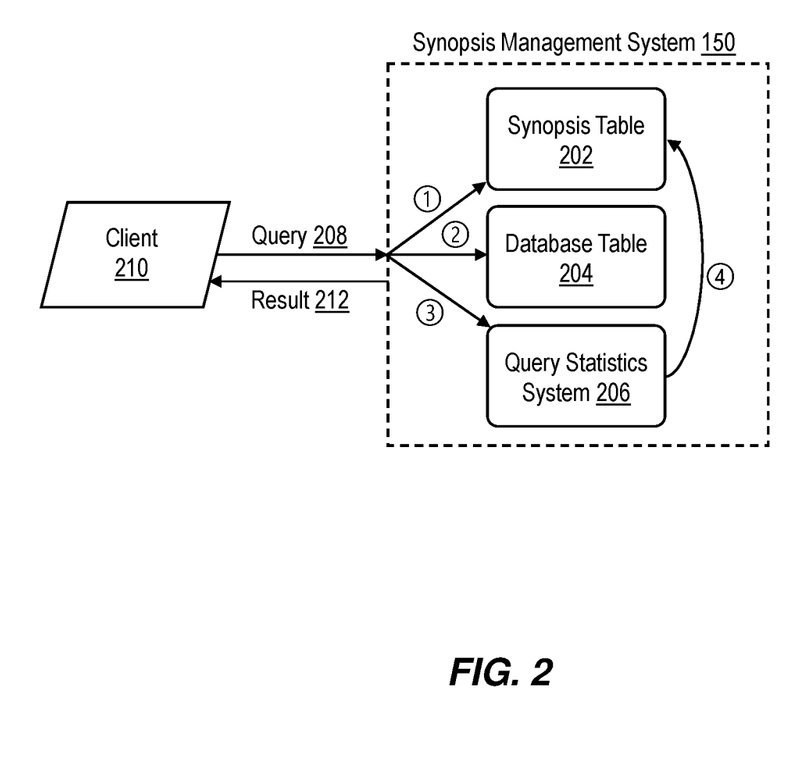
FIG. 2 depicts a block diagram of components of a synopsis management system in accordance with one or more embodiments.

FIG. 2 depicts a block diagram of components of the synopsis management system 150 of FIG. 1 according to one or more embodiments described herein. In some embodiments, the synopsis management system 150 includes a synopsis table 202, a database table 204, and a query statistics system 206. In some embodiments, the synopsis management system 150 is configured to receive a database query (here, query 208) from a client 210. The client 210 can include external system(s) (e.g., a user terminal) and/or upstream internal system(s) (e.g., a query optimizer of a DBMS, a query router, etc.). In some embodiments, the synopsis management system 150 includes a query optimizer (not separately shown).

In some embodiments, the synopsis management system 150 is configured to read, responsive to receiving the query 208, metadata stored in the synopsis table 202 (denoted by the stylized "1"). As discussed previously, synopsis metadata (e.g., synopsis table 202 metadata) can include aggregated information about values found in a predetermined subset of an underlying database table (e.g., database table 204), such as the minimum and maximum values for each column within a predefined range of rows. Other metadata can include data range boundaries, data distributions, such as the number of distinct values in a column, the frequency of those values, and histograms representing the distribution of values across the respective data ranges, data cardinalities, such as the number of rows within specific value ranges or satisfying certain predicates, the presence and/or location of null values, and the various data types found in the columns.

In some embodiments, the synopsis management system 150 is configured to leverage the metadata to determine an efficient execution plan for the query 208. The specific query optimizations available for a particular query and respective metadata in the synopsis table 202 is not meant to be particularly limited, and will vary from application to application, and from query to query. Query optimizations can include predicate pushdowns, such as when WHERE clause predicates can be compared to the metadata to filter out irrelevant data early in the query process. For example, by looking at the metadata in the synopsis table 202, the synopsis management system 150 can identify data ranges that satisfy the predicate(s) and can skip over irrelevant portions of the database table 204. Query optimizations can include column selection, such as when metadata about the distribution of values in the database table 204 can be leveraged to determine which columns should be retrieved and included in a result set (e.g., Result 212). For example, the synopsis management system 150 can choose to prioritize columns with high selectivity and/or columns required for filtering and join conditions. Query optimizations can include join order selection, such as when metadata about the distribution and cardinalities of data can be used to choose the order in which to join the tables in a multiple table query (reducing the amount of data that needs to be joined). Query optimizations can include join strategy selection, such as when an optimizer can select a particular join strategy (e.g., nested loops, hash join, merge join, etc.) based on the size and distribution of the data. Query optimizations can include aggregation and grouping, such as when an optimizer can use metadata about data ranges and values to determine optimal grouping strategies (reducing the amount of data that needs to be processed).

In some embodiments, the synopsis management system 150 is configured to select a query execution plan having a lowest estimated cost after estimating the cost of each potential execution plan and considering the metadata-driven optimizations. In some embodiments, the synopsis management system 150 is configured to execute the query 208 against the database table 204 according to the selected query execution plan (denoted by the stylized "2"). In some embodiments, the synopsis management system 150 is configured to provide the results 212 of the execution of the query 208 to the client 210.

In some embodiments, the synopsis management system 150 is configured to collect, via the query statistics system 206, information about executed queries (denoted by the stylized "3"). In some embodiments, query data is collected over a sliding window. For example, query data can be collected over the previous hour, 4 hours, 12 hours, 24 hours, 28 hours, week, month, year, etc. Additionally, or alternatively, query data can be collected for the previous m queries, where m can be set and/or adjusted as desired for a given application. In some embodiments, query statistics system 206 is configured to identify a trend within the sliding window. For example, trend analysis can indicate that lower and/or upper bounds of a range predicate(s) increase when m contains more recent queries (i.e., a positive trend bias). In some embodiments, the synopsis management system 150 is configured to update the synopsis table 202 and/or build a new synopsis table from the information collected by the query statistics system 206 (denoted by the stylized "4"). Query collection and synopsis updating is discussed in more detail with respect to FIG. 3.

Figure 3:
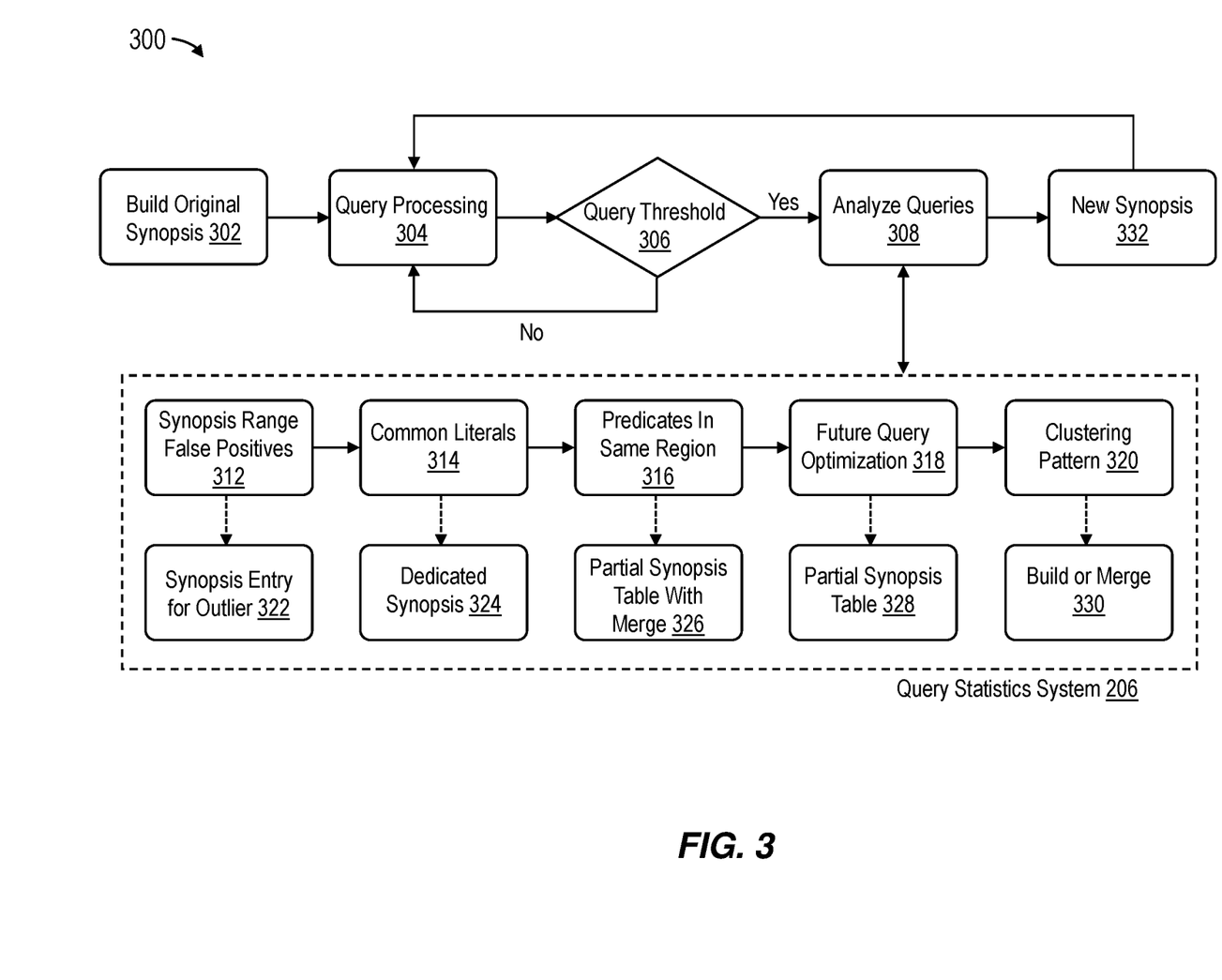
FIG. 3 depicts a block diagram of an example synopsis management architecture for a synopsis management system in accordance with one or more embodiments.

FIG. 3 illustrates a block diagram of an example synopsis management architecture 300 for the synopsis management system 150 of FIG. 2 in accordance with one or more embodiments. As shown in FIG. 3, step 302 includes building an original synopsis table (e.g., the synopsis table 202) for a respective database table (e.g., the database table 204). The original synopsis table can be built using known processes and is not meant to be particularly limited. For example, an original synopsis table can be built for every r rows of a database table. Each synopsis table can contain metadata for the database table, such as the minimum and maximum values in the respective r rows of the database table.

At step 304, a query for the database table is received and processed. In some embodiments, processing the query includes comparing the query to the original synopsis table(s), executing the query against the database table based on optimizations learned from metadata in the original synopsis table(s), and returning (reporting) the results of the query (refer to FIG. 2). In some embodiments, processing the query includes collecting information about the executed queries. This information can include the constraints (e.g., literals and predicates) of the query as well as the query itself (e.g., name="Alice", date between 1900 and 2000, category="flight", etc.).

At step 306, a query collection threshold is checked to determine whether sufficient query data has been collected to trigger a reevaluation of the current synopsis table(s) (i.e., whether there is sufficient query history). The query collection threshold can be a predetermined threshold. For example, the predetermined threshold could be 2 queries, 10 queries, 100 queries, 1000 queries, etc. The query collection threshold is not meant to be particularly limited and can be set and/or adjusted as needed for a particular application. In some embodiments, if the query collection threshold has not been satisfied (e.g., 406 queries have been collected and the query collection threshold is 1000), the synopsis management architecture 300 returns to step 304 for additional query collection. In some embodiments, if the query collection threshold has been satisfied, the synopsis management architecture 300 proceeds to step 308.

At step 308, the collected queries are analyzed to identify one or more queries where the current synopsis was suboptimal. As used herein, a "suboptimal" synopsis means a synopsis which was not able to be used to accelerate the execution of a query. In other words, a suboptimal synopsis is a synopsis that was not relevant (wholly or partially) to the query. For example, a synopsis having metadata for a set of 5 literals is suboptimal for all queries against literals that are not in that set of literals.

In some embodiments, a synopsis can be identified as a suboptimal synopsis empirically. Consider a database table with n rows, for example, 1,000,000,000 rows. Consider further a synopsis table where one synopsis entry is created for each r rows of the database table. If r is 1000, for example, the synopsis table will have n/1000 rows, or 1,000,000 rows. Observe that a scan of the synopsis table is 1000 times faster than a scan of the database table, since it scans 1,000,000 rows instead of 1,000,000,000 rows. However, for synopsis data to be effective, the synopsis table must effectively filter out a significant number of rows from the database table. If no filtering can be performed, performance is actually worse, since a first scan of the 1-million row synopsis table must be followed by a second scan of all 1-billion rows of the database table. With filtering, for example, if the synopsis table entries can be used to filter out 95 percent (or 70 percent, 50 percent, etc.) of sets of r rows from the database table, then the second scan need only include the remaining 5 percent (or 30 percent, or 50 percent, etc.) of rows in the database table. In this example, the synopsis metadata has allowed the overall scan to avoid reads of 95% of the 1-billion rows, a reduction of 950,000,000 rows of the database table. The "cost" for this reduction is the extra reads of the 1,000,000 rows from the synopsis table, which allowed the 950,000,000 reduction in database table row reads. Overall, empirically, the synopsis table allowed for scanning 51,000,000 rows in total (1 million from the synopsis table, 50 million from the database table), instead of 1 billion database table rows from a naïve approach.

The synopsis table can be empirically qualified from these results, as synopsis entries are created for each r=1000 rows, a so-called break even (i.e., the point at which total reads is the same with or without the synopsis table) is achieved if the synopsis metadata is able to filter at least 0.1 percent of sets of r rows from the database table. Thus, to measure an effectiveness of synopsis metadata empirically, a runtime filtering factor (i.e., the percent of rows from the database table that was filtered due to the synopsis table) is determined for a synopsis scan. In this scenario, a suboptimal synopsis means, empirically, that break even was not achieved (that is, the synopsis table lowers query performance).

Continuing with the prior example, if it is known a priori that a synopsis table is only valid for a set of x literals, and the query predicate literals are not included in that list, the synopsis cannot filter anything, and will necessarily have a filter factor of 0 percent. In some embodiments, the filtering factor is known for a given query. In some embodiments, the filtering factor is not known ahead of time. In those scenarios, the synopsis table can be scanned to empirically determine the filtering factor as described previously and, if the filter factor from that synopsis table scan is less than 0.1 percent, the synopsis table lowers query performance. Note that the 0.1 percent break even described herein is merely illustrative, and that the break even for a given synopsis of a database table will vary.

In some embodiments, identifying a suboptimal query causes the synopsis management architecture 300 to complete a query and data analysis process using the query statistics system 206. In some embodiments, the query statistics system 206 includes a number of models and/or modules (here, modules 312, 314, 316, 318, and 320) configured to analyze suboptimal queries in consideration of the collected query data. In some embodiments, each module is further configured to determine a synopsis modification (here, synopsis modifications 322, 324, 326, 328, and 330) responsive to the analysis. The synopsis modification can include the construction of a new synopsis table, an edit to an existing synopsis table, the creation of a partial synopsis table, merging two or more existing synopsis tables, etc. In some embodiments, the modules are arranged within the query statistics system 206 workflow in order of the costs associated with each respective evaluation/check. In some embodiments, the query statistics system 206 is configured to serially check the modules 312, 314, 316, 318, and 320 until a synopsis modification is found. In some embodiments, downstream modules (i.e., those modules checked after a respective module) are skipped once a synopsis modification is found, ensuring that only the least costly evaluations/checks are required for a particular synopsis modification.

In some embodiments, the query statistics system 206 can include a module configured to determine whether a synopsis range has a relatively large number of false positives (as shown, the "synopsis range false positives" module 312). As used herein, a relatively large number of false positives means that the number of false positives was greater than a predetermined threshold (e.g., 5 percent, 10 percent, etc.). In some embodiments, the module 312 is configured to generate a synopsis modification to reduce the number of false positives (as shown, the "synopsis entry for outlier" synopsis modification 322). For example, a synopsis entry for an outlier can be added to a current synopsis table to reduce false positives caused by the outlier.

In some embodiments, the query statistics system 206 can include a module configured to determine whether a statistically significant number of queries are searching for the same literal and/or the same set of literals (as shown, the "common literals" module 314). As used herein, a statistically significant number of queries means a number of queries greater than a predetermined threshold (e.g., more than or equal to 30 percent of all queries, or 50 percent, 75 percent, etc.). In some embodiments, the module 314 is configured to generate a synopsis modification to optimize synopsis metadata for queries against those common literals (as shown, the "dedicated synopsis" synopsis modification 324). For example, a new synopsis table can be built specifically for this literal and/or set of literals. An example implementation for optimizing synopsis tables for common literals is discussed in greater detail with respect to FIG. 4.

In some embodiments, the query statistics system 206 can include a module configured to determine whether predicates are always (or above some predetermined likelihood) found in the same region of a database table (as shown, the "predicates in same region" module 316). As used herein, a same region of a database table means a subset of same columns (or rows) of the table (depending, e.g., on whether the data is organized via columns or rows) where multiple adjacent or nearby rows (or columns) have similar column (or row) values. For example, consider a scenario where, for a column 'purchase_date', database table rows with row identifiers (row IDs) 1,450,000 to 1,700,000 all have values that lie in the month of June 2023, and rows from 1,700,001 to 1,950,000 are from July 2023. In this scenario, for the column 'purchase_date', a first region is from rows 1,450,000 up to 1,700,000, and a separate, second region is from rows 1,700,001 up to 1,950,000.

To illustrate, consider an example scenario where a health insurance company maintains a profile database of their members. The health insurance company would like to call its customers about a new vaccination that a medical advisory board recommends for anyone above 60 years old. As a result of this, the access patterns (queries) against the member database change—because the phone numbers for everyone above 60 years old need to be located, a large number of queries are limited to that group of customers.

In this scenario, module 316 can determine that a particular predicate "IS age 60" is always found in the "last month" column of the database table. In some embodiments, the module 316 is configured to generate a synopsis modification to build a partial synopsis table for the "last month" column (as shown, the "partial synopsis table with merge" synopsis modification 326). In some embodiments, synopsis metadata can be merged for one or more unused columns/rows (i.e., those regions related to customers that are not yet 60 years old).

In some embodiments, the query statistics system 206 can include a module configured to predict useful predicates and/or literals for future queries (as shown, the "future query optimization" module 318). Continuing from the prior example, observe that, each month, additional customers will turn 60 years old and will need to be included in the group of customers to be informed about the vaccine. As a result, over the following months, the access patterns change in a predictable way: each month, the queries are changed to include the customers that turned 60 in the last month.

In some embodiments, the module 318 can identify the pattern that a particular predicate "IS age 60" updates at the start (or end) of each month to the next column (which then becomes the "last month"). In some embodiments, the module 316 is configured to generate a synopsis modification to proactively build a partial synopsis table for this next column (as shown, the "partial synopsis table" synopsis modification 328). In some embodiments, synopsis metadata can be merged for one or more unused rows (e.g., those rows pertaining to customers under the age of 60).

In some embodiments, the query statistics system 206 can include a module configured to leverage a clustering algorithm to find patterns in the query history (as shown, the "clustering pattern" module 320). Clustering algorithms can determine, for example, that a subset of queries always access the same column when those queries include a particular set of literals. The particular clustering algorithm(s) underlying the module 320 are not meant to be particularly limited, but can include, for example, K-Means clustering (partitioning query data into K clusters by minimizing the distance between data points and the centroids of their respective clusters, wherein in the context of query clustering, features such as query execution time, query complexity, and accessed tables can be used to define data points), hierarchical clustering (creating tree-like structures of nested clusters by treating each query as a single cluster and then iteratively merging or dividing clusters based on similarity scores), density-based spatial clustering (identify clusters of queries with similar query structures and/or access patterns by grouping query data points that are close to each other in terms of a specified distance threshold), agglomerative clustering (treat each query as a separate cluster and then iteratively merge the n most similar clusters until a stopping criterion is met), mean shift clustering (identify region(s) of high data density by iteratively shifting a window towards the densest area of data points), Gaussian mixture model (GMM) clustering (treat query data points as a mixture of multiple Gaussian distributions to capture more complex patterns in query data that might not be well-suited for simple distance-based algorithms), and/or self-organizing maps (a neural network-based algorithm that maps high-dimensional data onto a lower-dimensional grid that can reveal underlying patterns in query data by arranging similar queries close to each other in the grid).

In some embodiments, the module 320 is configured to generate a synopsis modification to build and/or merge synopsis information for the identified clusters and/or columns (as shown, the "build or merge" synopsis modification 330). For example, the module 320 can create and/or modify a synopsis to make the synopsis more fine-grained for this particular region of the database table. Optionally, synopsis data can be merged for other parts of the column outside of the identified cluster (i.e., those queries which do not need frequent access), to further speed up scanning the synopsis table.

At step 332, a new synopsis can be constructed according to the respective synopsis modification 330 identified from step 308. In some embodiments, a "new" synopsis is a modification of the original synopsis. In some embodiments, a new synopsis is a dedicated synopsis table and/or partial synopsis table. In some embodiments, the new synopsis can augment and/or replace a current synopsis (e.g., the synopsis table 202 of FIG. 2), as desired. In this manner the synopsis table 202 can be dynamically modified over time responsive to the query statistics system 206.

Figure 4:
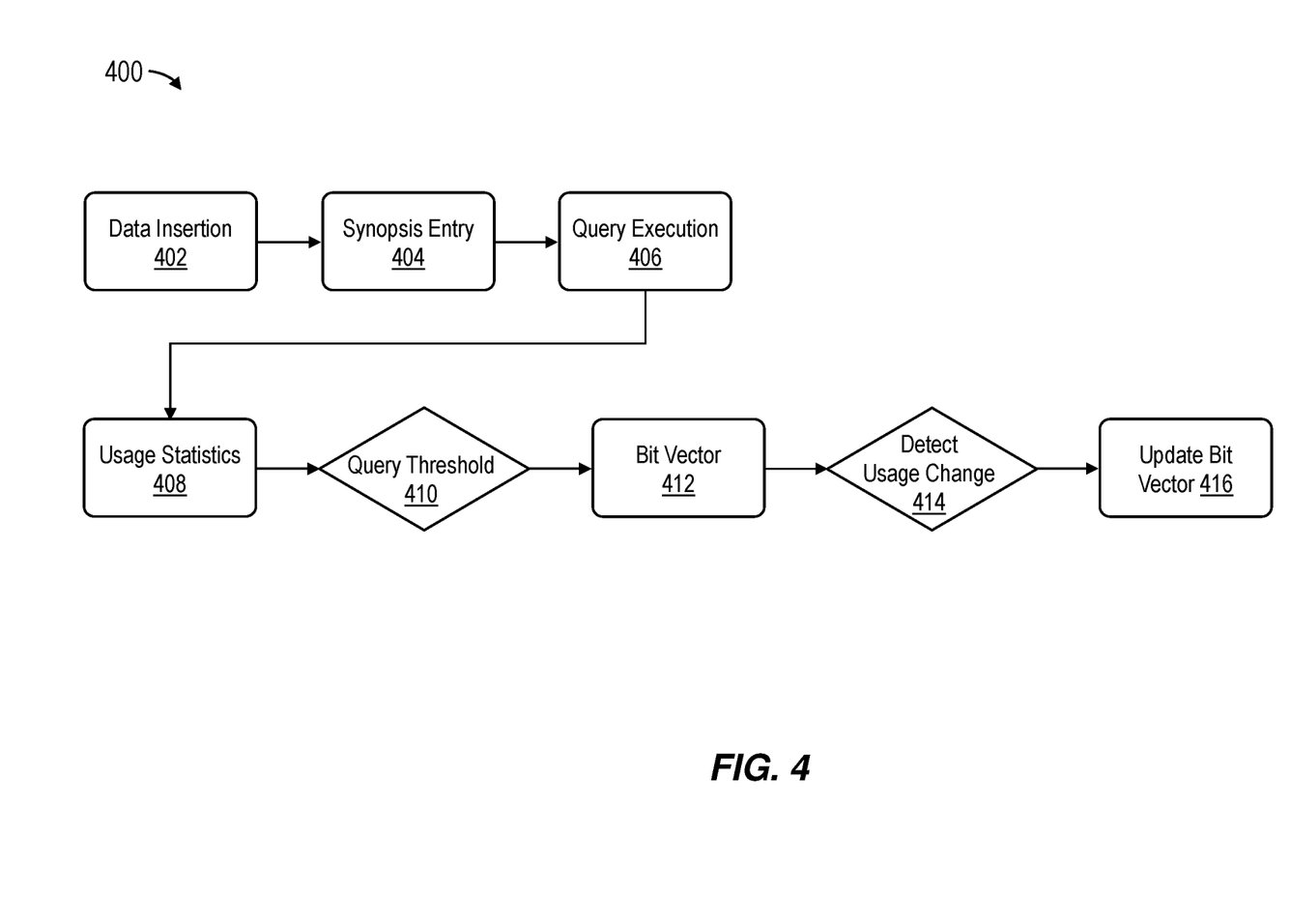
FIG. 4 depicts a block diagram of an example implementation of a synopsis management system in accordance with one or more embodiments.

FIG. 4 illustrates a block diagram of an example implementation 400 of the synopsis management system 150 of FIG. 2 in accordance with one or more embodiments. As shown in FIG. 4, at step 402, data is entered into a database table (also referred to as a "data insertion"). At step 404, a synopsis entry is created for every r rows in the database table. At step 406, one or more queries are executed against the database table.

At step 408, information about the executed queries, such as usage statistics, are compiled. Query information can be collected continuously and/or periodically as discussed previously with respect to the synopsis management system 150 and the query statistics system 206. In some embodiments, usage statistics include the n most used literals in equality predicates within the executed queries. In some embodiments, the n most used literals are determined by counting distinct literal values. At step 410, a query collection threshold is checked to determine whether sufficient query data has been collected to trigger a reevaluation of the current synopsis table(s).

If the query collection threshold is met, a bit vector 412 can be generated to encode the n most used literals. In some embodiments, a bit vector of length n is added to each synopsis entry. In some embodiments, each bit in the bit vector 412 represents one of the n most used literals. For example, if a first bit is unset (i.e., the first bit=0), the first literal is not present in the data that the respective synopsis entry refers to. Continuing this example, if a second bit is set (i.e., the second bit=1), the second literal is present in the data.

In some embodiments, a maximum size (length) of the bit vector 412 is constrained to balance the tradeoff costs of accessing bit vector data against the cost of reading all database table data (i.e., the naive approach). Observe, for example, that each bit added to the bit vector 412 increases the cost of checking the bit vector 412 for all bits. In some embodiments, the maximum size (length) of the bit vector 412 can be set empirically, for example, based on known and/or current literal access data from current and/or prior queries. For example, if usage statistics drop significantly (with respect to any predetermined threshold) between the $11^{th}$ and $12^{th}$ literals of the collected queries, the bit vector 412 can be set to size 11. In some embodiments, the bit vector 412 generated for each synopsis entry can be used to accelerate queries against the database table.

At step 414, a change in the usage statistics is detected. For example, a change in the n most used literals can be detected. This can occur, for example, in implementations where query statistics are collected for queries within a sliding window due to updates in the collected queries.

At step 416, the bit vector 412 is updated to reflect the detected change in the usage statistics. For example, the value(s) of one or more bits in the bit vector 412 can be changed (flipped) to represent the current allocation of literals within the collected queries (i.e., to reflect the current n most used literals). In some embodiments, the updated bit vector 412 is leveraged to modify a synopsis and/or to create a new synopsis (e.g., the new synopsis discussed previously with respect to step 332). In this manner, a dynamic synopsis table can be provided that continuously and/or periodically adapts to new query and/or data patterns.

In some embodiments, the modified and/or new synopsis containing the bit vector 412 can be leveraged to optimize a query. For example, when a query contains at least one of the n most used literals, the bit vector 412 can be read to easily determine whether the literal of interest is at all present in the corresponding r rows of the synopsis, thus avoiding unnecessary reads of a large portion of the underlying database table.

Figure 5:
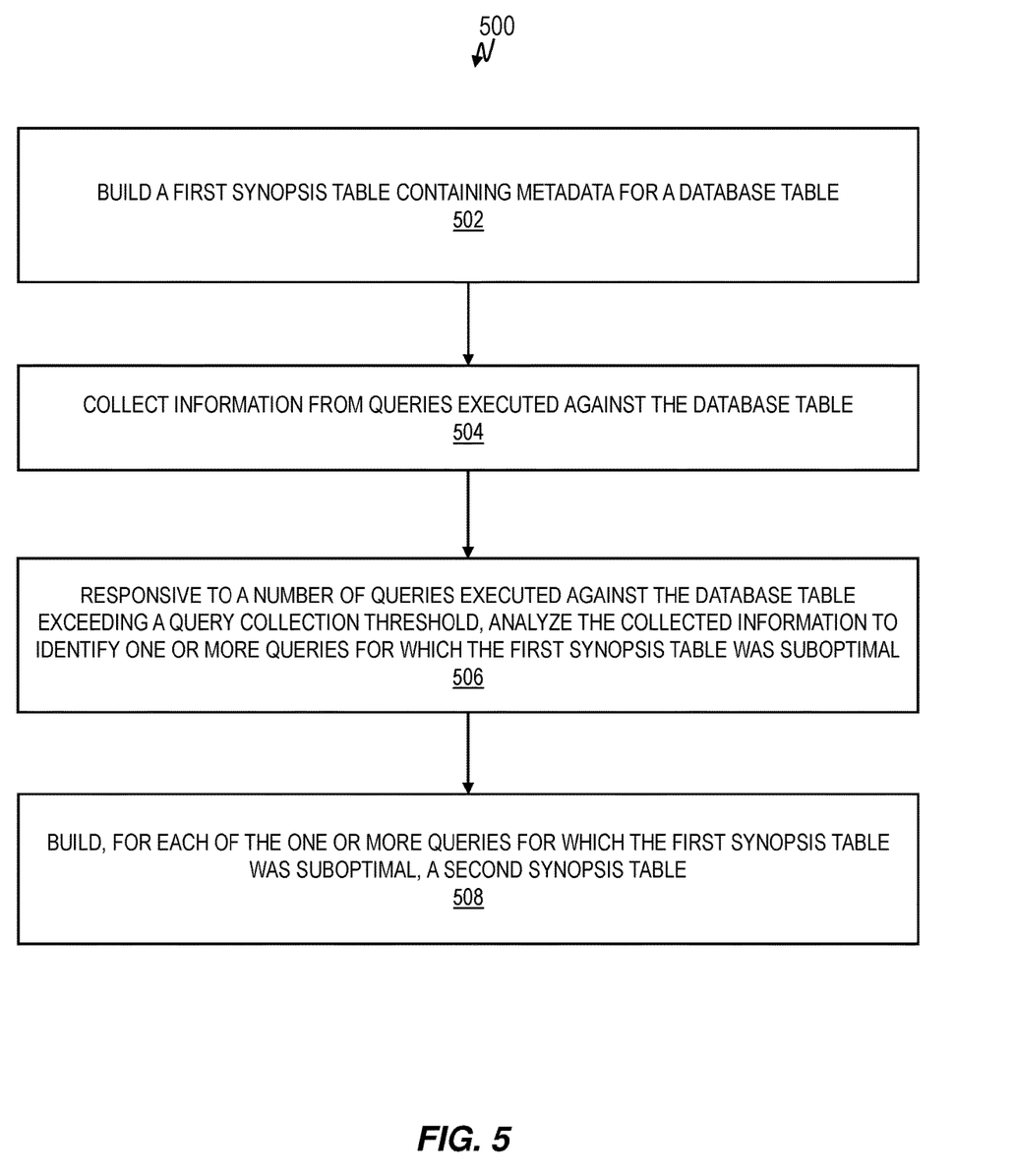
FIG. 5 is a flowchart in accordance with one or more embodiments of the present invention.

Referring now to FIG. 5, a flowchart 500 for providing a query and data adaptive synopsis table is generally shown according to an embodiment. The flowchart 500 is described in reference to FIGS. 1-4 and may include additional blocks not depicted in FIG. 5. Although depicted in a particular order, the blocks depicted in FIG. 5 can be rearranged, subdivided, and/or combined. In exemplary embodiments, the method 500 can be performed by a computing environment (e.g., computing environment 100 shown in FIG. 1).

At block 502, the method includes building a first synopsis table containing metadata for a database table. In some embodiments, first synopsis tables are built for every r rows of the database table.

At block 504, the method includes collecting information from queries executed against the database table. In some embodiments, collecting information from the queries includes collecting the literals and predicates of the query.

At block 506, the method includes, responsive to a number of queries executed against the database table exceeding a query collection threshold, analyzing the collected information to identify one or more queries for which the first synopsis table was suboptimal. In some embodiments, a "suboptimal" synopsis table means a synopsis table that was not relevant to the respective query. In some embodiments, a "suboptimal" synopsis table means a synopsis table that could be improved using query statistics as described previously herein (refer to FIG. 3 and the query statistics system 206).

At block 508, the method includes building, for each of the one or more queries for which the first synopsis table was suboptimal, a second synopsis table.

In some embodiments, the method includes processing the queries executed against the database table. In some embodiments, processing a query includes reading metadata in the first synopsis table, executing the query against the database table based on query optimizations learned from the metadata, and returning results of the query.

In some embodiments, collecting information from queries includes identifying the n most used literals in the queries. In some embodiments, building an updated synopsis table includes building a bit vector of length n such that each bit in the bit vector represents one literal of the n most used literals.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
building a first synopsis table containing metadata for a database table;
collecting information from queries executed against the database table, wherein collecting information from queries comprises identifying the n most used literals in equality predicates across the queries;
determining that a number of queries executed against the database table exceeds a query collection threshold;
responsive to determining that a number of queries executed against the database table exceeds the query collection threshold, analyzing the collected information to identify one or more queries for which the first synopsis table was suboptimal; and
building, for each of the one or more queries for which the first synopsis table was suboptimal, a second synopsis table, wherein building the second synopsis table comprises building a bit vector of length n such that each bit in the bit vector represents one literal of the n most used literals and adding the bit vector of length n to the first synopsis table.

2. The computer-implemented method of claim 1, wherein first synopsis tables are built for every r rows of the database table.

3. The computer-implemented method of claim 1, further comprising processing the queries executed against the database table, wherein processing a query comprises reading metadata in the first synopsis table, executing the query against the database table based on query optimizations learned from the metadata, and returning results of the query.

4. The computer-implemented method of claim 1, wherein collecting information from the queries comprises collecting literals and predicates of the query.

5. The computer-implemented method of claim 1, wherein a suboptimal synopsis table comprises a synopsis table that was not relevant to the respective query.

6. A system having a memory, computer readable instructions, and one or more processors for executing the computer readable instructions, the computer readable instructions controlling the one or more processors to perform operations comprising:
building a first synopsis table containing metadata for a database table;
collecting information from queries executed against the database table, wherein collecting information from queries comprises identifying the n most used literals in equality predicates across the queries;
determining that a number of queries executed against the database table exceeds a query collection threshold;
responsive to determining that a number of queries executed against the database table exceeds the query collection threshold, analyzing the collected information to identify one or more queries for which the first synopsis table was suboptimal; and
building, for each of the one or more queries for which the first synopsis table was suboptimal, a second synopsis table, wherein building the second synopsis table comprises building a bit vector of length n such that each bit in the bit vector represents one literal of the n most used literals and adding the bit vector of length n to the first synopsis table.

7. The system of claim 6, wherein first synopsis tables are built for every r rows of the database table.

8. The system of claim 6, further comprising processing the queries executed against the database table, wherein processing a query comprises reading metadata in the first synopsis table, executing the query against the database table based on query optimizations learned from the metadata, and returning results of the query.

9. The system of claim 6, wherein collecting information from the queries comprises collecting literals and predicates of the query.

10. The system of claim 6, wherein a suboptimal synopsis table comprises a synopsis table that was not relevant to the respective query.

11. A computer program product comprising a computer readable storage medium having program instructions embodied therewith, the program instructions executable by one or more processors to cause the one or more processors to perform operations comprising:
building a first synopsis table containing metadata for a database table;
collecting information from queries executed against the database table, wherein collecting information from queries comprises identifying the n most used literals in equality predicates across the queries;
determining that a number of queries executed against the database table exceeds a query collection threshold;
responsive to determining that a number of queries executed against the database table exceeds the query collection threshold, analyzing the collected information to identify one or more queries for which the first synopsis table was suboptimal; and
building, for each of the one or more queries for which the first synopsis table was suboptimal, a second synopsis table, wherein building the second synopsis table comprises building a bit vector of length n such that each bit in the bit vector represents one literal of the n most used literals and adding the bit vector of length n to the first synopsis table.

12. The computer program product of claim 11, wherein first synopsis tables are built for every r rows of the database table.

13. The computer program product of claim 11, further comprising processing the queries executed against the database table, wherein processing a query comprises reading metadata in the first synopsis table, executing the query against the database table based on query optimizations learned from the metadata, and returning results of the query.

14. The computer program product of claim 11, wherein a suboptimal synopsis table comprises a synopsis table that was not relevant to the respective query.

* * * * *